INVENTOR.
VINTON B. YARDLEY
BY M. A. Holtz
ATTORNEY

INVENTOR.
VINTON B. YARDLEY
BY M. A. Hobbs
ATTORNEY

United States Patent Office 3,497,274
Patented Feb. 24, 1970

3,497,274
BEARING
Vinton B. Yardley, South Bend, Ind., assignor to Reliance Electric Company, a corporation of Delaware
Filed Aug. 31, 1967, Ser. No. 664,838
Int. Cl. F16c 13/00, 39/00, 35/00
U.S. Cl. 308—15   9 Claims

ABSTRACT OF THE DISCLOSURE

A pillow block having an axial bore therethrough, a bearing race disposed in said bore, and end members adjustable axially inwardly and outwardly in each end of the bore to accommodate bearing races of different axial widths. The end members are secured in place by a snap ring and a series of grooves in the end members providing a plurality of axial positions in the housing for the end members.

---

One type of conventional pillow block housing consists of a base adapted to be bolted to a footing or other supporting structure and a cover secured by bolts or screws to the base, the base and cover having an inner annular cavity in which a roller or ball bearing unit is seated and held firmly in place by the cover and the bolt or cap screws therefor. An annular recess is provided in the internal wall of the cavity for receiving and firmly holding the outer race of the bearing. In the past, the base and cover were each made in a single piece with inwardly extending flanges formed integrally therewith and having openings for the shaft and a shaft seal. Since this line of pillow blocks normally has a range of bearing sizes and types, a number of different size housings were required and usually kept in inventory in order to cover the range and satisfy customer demands. It is therefore one of the principal objects of the present invention to provide a pillow block of the aforementioned type in which the housing is so constructed and arranged that it can be readily adapted to various sizes and configurations of bearing units and which can be easily assembled to accommodate a particular shaft size.

Another object of the invention is to provide a pillow block housing of simple construction which can easily be fabricated and readily assembled with various size bearings and which can be constructed with interchangeable parts to satisfy shaft and bearing requirements.

Still another object is to provide a pillow block structure of the aforesaid type in which the end members of the housing are annular in shape and separate from the cap and base, and in which the separate end members are movable axially with respect to the cap and base in order to vary the size of the cavity in which the bearing unit is seated.

A further object of the invention is to provide a pillow block housing in which the axial bore therethrough is substantially straight and can easily be drilled or machined, and in which the end members or flanges are of simple design and are so constructed that they can be inserted in the bore and removably retained therein by snap rings or the like seated in one of the number of annular grooves.

Additional objects and advantages of the present invention will become apparent from the following description and accompanying drawings, wherein.

Figure 2:
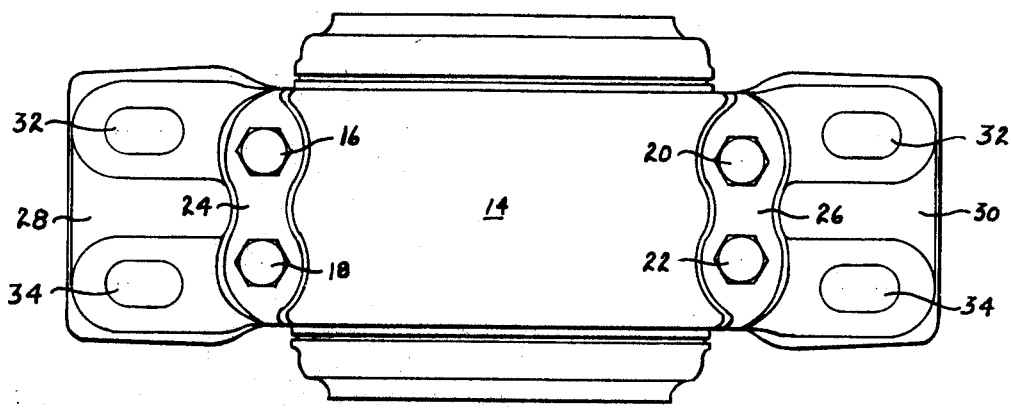
FIGURE 2 is a top plan view of the pillow block shown in FIGURE 1 with the shaft removed therefrom.
Figure 1:
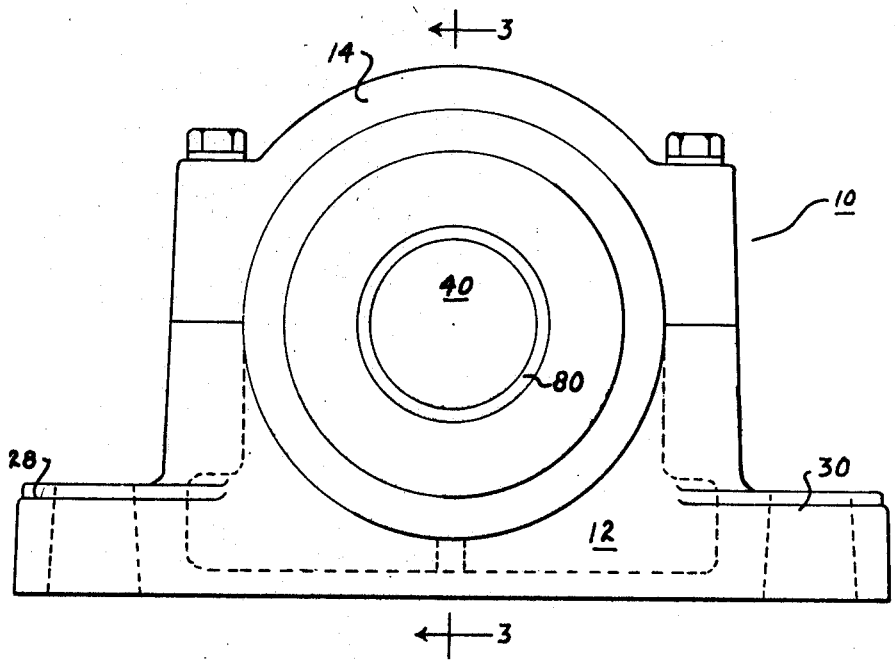
FIGURE 1 is a side elevational view of a pillow block embodying the present invention, showing the shaft journalled therein.

Referring more specifically to the drawings, numeral 10 designates the present pillow block having a base 12 and a cap 14 secured to said base 12 by bolts 16, 18, 20, and 22 extending down through flanges 24 and 26 of the cap into threaded bores in the base. While four screws are shown, two on each side of the shaft, the cap may be retained securely in place by a single bolt on each side. The base is provided with laterally extending flanges 28 and 30, each having holes 32 and 34 therein for receiving bolts, studs or other securing means for mounting the pillow block on a footing or other supporting structure.

Figure 3:
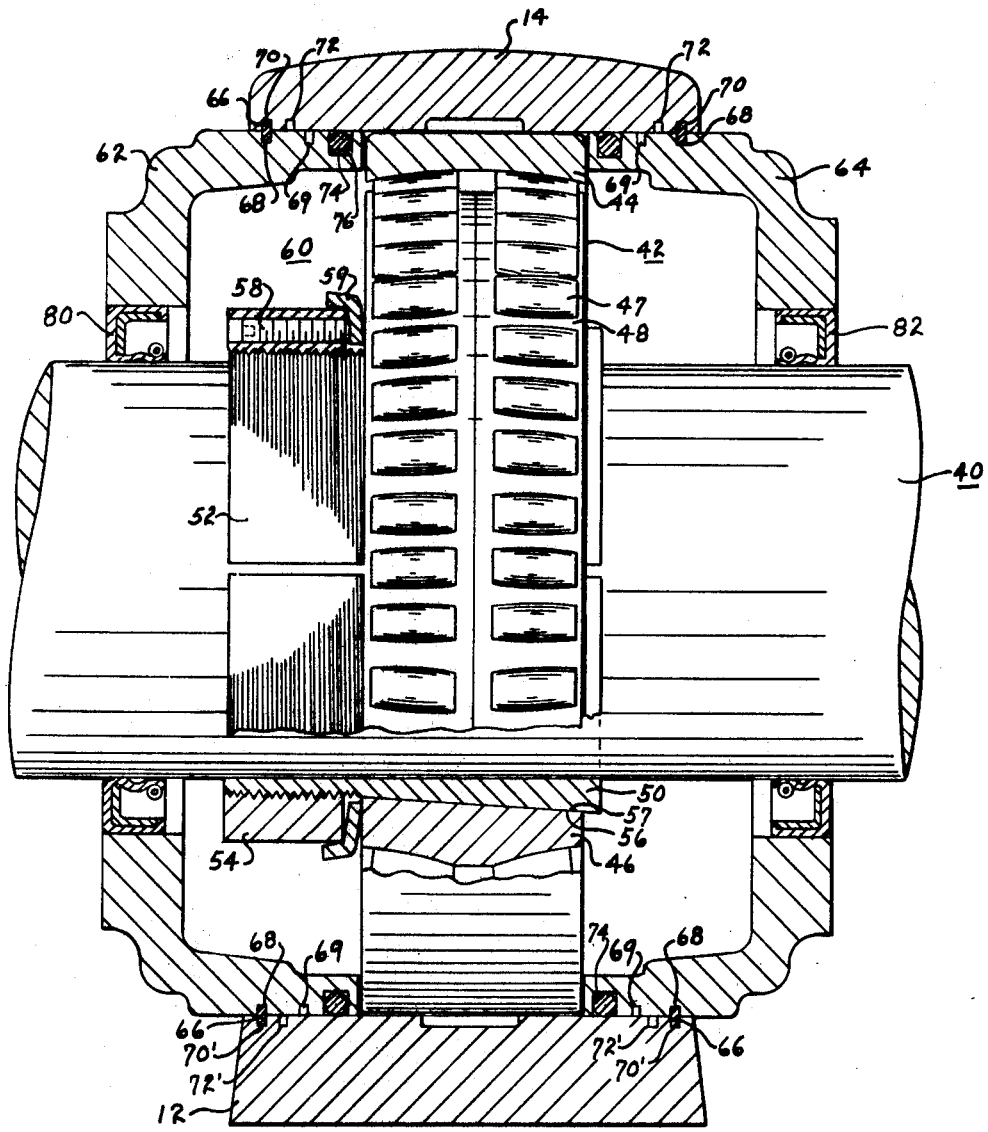
FIGURE 3 is a vertical cross sectional view of the pillow block shown in FIGURES 1 and 2, in which the section is taken on line 3—3 of FIGURE 1, and in which the bearing unit is shown partially in elevation and partially in section.

Shaft 40 is journalled in bearing 42, and for the purpose of the present invention, both the shaft and the bearing may be considered conventional in construction and operation. The bearing is preferably a spherical roller bearing having outer and inner races 44 and 46, respectively, and rollers 47 in cage 48. Bearing 42 is retained firmly on shaft 40 by a securing means consisting of a tapered adapter 50 having a threaded portion 52 onto which ring 54 is mounted. The adapter is tapered on its external surface 56 and the inner race 46 is tapered on its internal surface 57. The surfaces are urged into firm contact with one another by a plurality of screws 58 extending through ring 54 and engaging spacer 59 which is seated on the adjacent surface of the inner race. As the screws are tightened, the adpter is urged to the left as viewed in FIGURE 3, causing the adapter to contract firmly onto the shaft and to wedge itself firmly within the inner race. After the bearing has been mounted in the foregoing manner, it remains firmly in place on the shaft.

The housing of the present bearing or pillow block contains a cavity or bore 60 in which bearing 42 is seated and the bore through base 12 and cap 14 is substantially cylindrical and of substantially the same diameter as the external diameter of bearing 42. The two annular end members or flanges 62 and 64 substantially close the annular space between the shaft and the internal wall of the base and cap, each of the two end members being held in place by snap rings 66 seated in groove 68 or 69 in the external wall of the respective end member and in grooves 70 and 72 in cap 14 and 70' and 72' in base 12 at each end of the housing bore 60. When the cap and base are bolted together, in the manner previously described herein, grooves 70 and 70', and 72 and 72' form full annular grooves for snap rings 66, which retain the end members firmly in place after the bearing has been assembled so that it, in effect, forms an integral structure with the base and the cap. In order to prevent leakage of the lubricant from cavity 60, a gasket 74, such as an O-ring, seated in groove 76 in the periphery in each of the end members seats on the internal surface of base 12 and cap 14, forming an effective fluid-tight seal therewith. Seals 80 and 82 seal end members 62 and 64, respectively, around shaft 40, forming in effect a completely enclosed cavity 60 for the lubricant. Various other types of seals may be used for the desired leak-proof relation between the shaft and end members 62 and 64.

In order to accommodate varying axial widths of bearing units 42, the series of grooves 68 and 69 are provided in the periphery of members 62 and 64 and a series of grooves 70 and 72 are provided in the cap and base, so that the two end members can be moved axially inwardly toward or outwardly from bearing 42, thereby varying the distance between the inner ends of the two members to provide the required space for the particular bearing unit. While only two such additional annular grooves are shown in the periphery of end members 62 and 64 and in the cap and base, additional grooves may be provided if desired so that the space between the two end members may be varied over a wide range and/or varied by smaller increments. The two end members 62 and 64 are normally fabricated of the same material as the base and cap, i.e. gray iron or cast steel, and the two snap rings 66 may be conventional in construction. The cap and housing may be constructed as a single unit and the bearing assembled in place by slipping it axially into cavity 60.

In assembling the present bearing during installation, the base is normally secured to the supporting structure by bolts, studs, or other suitable securing means extending through holes 32 and 34 in flanges 28 and 30. After bearing 42 has been mounted in the base and shaft 40 journalled therein and ring 54 threaded onto tapered adapter 50, screws 58 are tightened, thereby securing the adapter to the shaft and the inner race 46 to the adapter. The end member 62 and 64 are installed on the shaft with the seals 80 and 82 in place and cap 14 is secured to the base 12 by screws 16, 18, 20 and 22. When the end members are inserted in place before cap 14 is secured to the base, the snap rings 66 are inserted in grooves 68, for example, and as shown extend into groove 70 when the cap is mounted on the base. In an alternate method of assembling the housing, the cap 14 is secured in place and the two end members with the snap rings in grooves 68 are slipped axially into cavity 60 until the snap rings seat in grooves 72 and 72', firmly retaining the two end members in place. The particular groove 68, or 69 in the end members and grooves 70 and 72 in the cap are selected in assembling the bearing, depending upon the axial width of bearing 42 used in the installation, and as shown in the drawings, the groove selected should place the inner ends of the two members 62 and 64 substantially against the sides of the outer race of bearing 42 if the installation is a non-expansion type. In the expansion type installation the inner ends of the two members are spaced from the bearing to permit the bearing to shift axially in the housing.

The present pillow block housing offers a number of advantages over conventional pillow block housings, in addition to the accommodation of different axial widths of bearings without modification of the housing structure. For example, the interchangeability of different end members for the end members 62 and 64 shown in the drawings, permits the utilization of different types of shaft seals and permits the basic housing structure to be adapted to shafts of different sizes and to stepped shafts. Further, the present pillow block housing can be readily adapted to an installation in which the shaft does not extend completely through the housing, thus permitting one end of the housing to be fully closed by the present end member without the usual center opening. The bearing and pillow block housing also can be easily installed and readily serviced, and the end members can be readily adjusted axially by selecting the proper combination of grooves 68 or 69 and 70 or 72 for the snap ring, to adapt the housing and bearing to either the expansion or non-expansion type installations.

Figure 4:
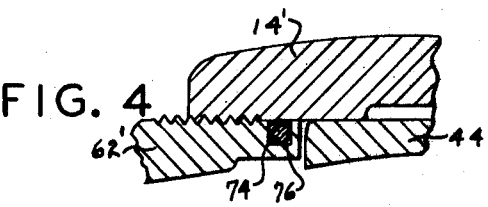
FIGURE 4 is a fragmentary sectional view, illustrating a modified form of the invention.

In the modified form of the invention illustrated in FIGURE 4, threads are used to interlock the base (not shown) and cap 14' and the end members 62' and 64', the threads on the respective interlocking parts being either with or without leads. With this arrangement the end members can be precisely located any desired distance from bearing 44 to provide an expansion type pillow block installation, or positioned in close proximity to the bearing to provide a non-expansion type installation.

In order to drain the oil and lubricate the bearing, a plug is provided in one or both end members 62 and 64 and a slot and pin are provided for holding the two end members in place with the plug in the lower portion of the housing. After the pillow block has been assembled in the foregoing manner, its operation is the same as conventional bearings of this type.

While only one embodiment of the present pillow block has been described in detail herein, various changes and modifications may be made without departing from the scope of the invention.

I claim:

1. In a pillow block having a bearing for journalling a shaft: a housing having an axial bore for said bearing, end members for said housing, at least one end member having a center opening for receiving the shaft, and means having a plurality of spaced axial positions for securing said end members in selected, fixed axial positions in said housing bore determined by the axial width of said bearing, said means including an annular groove means in the periphery of each end member, an annular groove means in the housing at each end of the bore, one of said groove means consisting of a plurality of spaced grooves, and a ring for seating in a groove in each end member and in a groove in said housing.

2. A housing for a pillow block as defined in claim 1 in which said means for securing said end members in position in the housing consists of a plurality of annular grooves in the periphery of each end member, a plurality of grooves in the housing at each end of the bore and a ring for seating in one groove in each end member and in one groove in said housing.

3. A housing for a pillow block as defined in claim 1 in which each end member has a center opening.

4. A housing for a pillow block as defined in claim 2 in which each end member has a center opening.

5. The housing for a pillow block as defined in claim 1 in which said end members have inwardly extending annular flanges and said means for securing said end members in position in the housing bore are located in the periphery of said flanges.

6. The housing for a pillow block as defined in claim 1 in which a seal is interposed between each of said end members and the wall of the housing defining said bore.

7. The housing for a pillow block as defined in claim 1 in which said end members are provided with annularly extending flanges and the bearing is disposed between the inner ends thereof in close proximity thereto.

8. The housing for a pillow block as defined in claim 1 in which said housing is divided into a base and a cap, and screws secure said cap and base together.

9. The housing for a pillow block as defined in claim 3 in which a seal is mounted in the center opening in each of said end members for engaging and forming a seal with the shaft.

References Cited

UNITED STATES PATENTS

| | | | |
|---|---|---|---|
| 1,699,330 | 1/1929 | Gayman | 308—236 X |
| 2,147,787 | 2/1939 | Ferguson | 308—236 X |
| 2,377,035 | 5/1945 | Pixley | 308—236 |
| 2,650,867 | 9/1953 | Spieth | 308—236 |
| 2,916,883 | 12/1959 | Geck | 277—237 X |
| 3,187,591 | 6/1965 | Johnson | 308—236 X |

CARROLL B. DORITY, Jr., Primary Examiner

U.S. Cl. X.R.

308—236